(12) United States Patent
Durkin et al.

(10) Patent No.: US 9,130,334 B2
(45) Date of Patent: Sep. 8, 2015

(54) APPARATUS AND METHOD FOR OPTICAL ISOLATION

(75) Inventors: Michael Kevin Durkin, Southampton (GB); Stewart Thomas Ingram, Salisbury (GB)

(73) Assignee: SPI UK Laserts Ltd., Southampton (GB)

( * ) Notice: Subject to any disclaimer, the term of this patent is extended or adjusted under 35 U.S.C. 154(b) by 287 days.

(21) Appl. No.: 13/475,047

(22) Filed: May 18, 2012

(65) Prior Publication Data

US 2012/0229910 A1    Sep. 13, 2012

Related U.S. Application Data

(60) Provisional application No. 61/488,236, filed on May 20, 2011.

(30) Foreign Application Priority Data

May 19, 2011    (GB) .................................. 1108470.4

(51) Int. Cl.
*G02B 27/30* (2006.01)
*H01S 3/00* (2006.01)
(Continued)

(52) U.S. Cl.
CPC .............. *H01S 3/005* (2013.01); *B23K 26/381* (2013.01); *B23K 26/401* (2013.01); *B23K 26/407* (2013.01); *B23K 26/422* (2013.01);
(Continued)

(58) Field of Classification Search
CPC .. B23K 26/381; B23K 26/401; B23K 26/407; B23K 26/422; G02B 19/0014; G02B 19/0047; G02B 6/4208; H01S 3/005

USPC .......... 359/484.03, 484.04, 484.02, 736, 793, 359/893, 365–366, 641, 646, 691, 823, 826
See application file for complete search history.

(56) References Cited

U.S. PATENT DOCUMENTS

| 5,359,689 | A | * | 10/1994 | Iwatsuka et al. ................. 385/73 |
| 6,122,106 | A | * | 9/2000 | Noyes et al. .................... 359/618 |
| 6,210,401 | B1 | * | 4/2001 | Lai ................................... 606/12 |
| 6,210,864 | B1 | * | 4/2001 | Sousa .......................... 430/302 |
| 6,331,692 | B1 | * | 12/2001 | Krause et al. ............ 219/121.73 |

(Continued)

FOREIGN PATENT DOCUMENTS

EP    1912297 A1    4/2008

OTHER PUBLICATIONS

U.K. Search Report in application No. GB 1108470.4 dated Sep. 16, 2011.

*Primary Examiner* — Scott J Sugarman
*Assistant Examiner* — Vipin Patel
(74) *Attorney, Agent, or Firm* — Iandiorio Teska & Coleman, LLP (57) ABSTRACT

Provided herein is an apparatus for optically isolating a light beam from a laser, comprising an optical isolator configured to isolate a light beam having a beam quality; a reference plane; an output connector disposed at the output of the optical isolator, wherein the output connector is configured with a common collimator interface to connect to a collimator which is capable of being mechanically referenced to the reference plane; a first lens arrangement disposed proximal to a distal end of the output connector, wherein the first lens arrangement is selected to provide an output light beam having a predetermined divergence. The laser can be selected from the group consisting of a fiber laser, a disk laser and a rod laser. Also provided herein are a system, a plurality of lasers, and a method of providing a light beam that has a consistent divergence and distance from a reference plane.

19 Claims, 4 Drawing Sheets

(51) Int. Cl.
  *B23K 26/30* (2014.01)
  *G02B 19/00* (2006.01)
  *B23K 26/40* (2014.01)
  *B23K 26/38* (2014.01)
  *G02B 6/42* (2006.01)
(52) U.S. Cl.
  CPC ........ *G02B19/0014* (2013.01); *G02B 19/0047* (2013.01); *G02B 6/4208* (2013.01)

(56) References Cited

U.S. PATENT DOCUMENTS

| | | | |
|---|---|---|---|
| 2004/0240767 A1* | 12/2004 | Kimura et al. | 385/11 |
| 2004/0240805 A1* | 12/2004 | Vakhshoori et al. | 385/98 |
| 2005/0036532 A1* | 2/2005 | McDonagh | 372/71 |
| 2006/0072632 A1 | 4/2006 | Flanders et al. | |
| 2007/0127123 A1 | 6/2007 | Brown et al. | |
| 2008/0130007 A1* | 6/2008 | O'Connell | 356/450 |

\* cited by examiner

APPARATUS AND METHOD FOR OPTICAL ISOLATION

CROSS-REFERENCE

The application claims priority to U.S. Provisional Patent Application Ser. No. 61/488,236 filed May 20, 2011, and claims priority to U.K. Patent Application No. GB 1108470.4 filed May 19, 2011, both of which are incorporated herein by reference in their entirety.

TECHNICAL FIELD

This invention relates to an apparatus and method for optically isolating a light beam from a laser.

BACKGROUND

There are many applications for lasers that require the output beam of a laser to be optically isolated to prevent back reflections damaging the laser or causing undesirable optical interactions. Examples include welding, cutting, drilling, cladding, brazing, marking, engraving, and slicing materials, especially highly reflective materials such as copper, brass, gold, silver and diamonds. The optical isolation is typically performed using an optical isolator through which the output beam of the laser is coupled. Back reflected light is then prevented from returning to the laser by the isolator. For low power laser systems, it is usually satisfactory to collimate the laser beam through the isolator. The laser beam would then be expanded by a beam expanding telescope and then coupled into a mechanical scanning optics which directs the beam to the material to be processed.

Mechanical scanning optics come in standard formats each of which is optimized for a collimated light beam of a specific beam diameter. Beam diameters ($1/e^2$) of 5 mm, 7.5 mm and 10 mm are very common choices. The laser manufacturer thus needs to provide beam expanding optics, such as beam expanding telescopes (BET), that output collimated laser beams that have these beam diameters.

As the average power of the laser system increases above approximately 1 W, the size of the collimator generally increases because of the need to avoid laser induced damage at optical surfaces of the crystals within the isolator. If size, cost (of an individual isolator) and isolation performance is not critical, the laser beam can still be collimated through the isolator, and expanded with beam expanding telescopes.

However, if cost is an issue (for example in lasers manufactured in high volumes for consumer electronics and marking applications), then isolator crystal size must be kept to a minimum. This leads to a requirement to focus the laser beam through the isolator in order to optimize the isolation performance. The light beam emerging from the isolator is therefore not collimated. A conventional approach would be to provide a collimating lens to collimate the light from the isolator to a standard beam diameter which is compatible with standard beam expanding telescopes. The benefits of this approach is that it reduces design effort as standard optics can be used.

The situation becomes more complicated when the same isolator product is being used with a family of high power lasers, where each laser type within the family has a different beam quality. This is because the optimization of the beam profile through the isolator is usually different for each laser, and in addition, different collimating lenses must be selected to collimate the output light to be compatible with the standard beam expanding telescopes.

Beam quality is usually defined in terms of $M^2$ or the beam parameter product. The $M^2$ of a laser beam defines how rapidly the beam diverges from a given aperture compared to a Gaussian beam from the same aperture: an $M^2$ of 2 means that the beam diverges twice as fast, and an $M^2$ of 3 three times as fast. The beam parameter product (BPP) is related to the $M^2$ by the equation:

$$BPP = M^2 \cdot \lambda/\pi \text{ (mm.mrad)}$$

where the wavelength $\lambda$ is given in micrometers (μm). Thus a ytterbium-doped fiber laser emitting at 1.06 μm and with an $M^2=1.0$ would have a BPP=0.338 mm.mrad. If the laser had an $M^2=2$, then the BPP=0.672 mm.mrad, and if the laser had an $M^2=3$, the BPP=1.01 mm.mrad.

If a product family of lasers were designed comprising three lasers having $M^2=1$, $M^2=2$, and $M^2=3$, then the difference in the beam quality (and hence beam divergence) would result in three different beam optimizations being required at the input to the respective optical isolator. There would also be three different beam collimator designs required for each of the three fiber lasers in order to match the output beams to the mechanical scanners described previously. These nine different collimator designs would not be interchangeable between the lasers without there being additional functionality to adjust the output beam to provide a collimated beam matched to the individual mechanical scanner units. Each of the lasers would have a single collimator design at its output to match the output beams to the expanded beam telescopes.

However, this conventional approach is not the option with the lowest cost materials. This is because the collimating lens at the output of the isolator is serving a similar purpose as the first lens in the beam expanding telescope. There is therefore a redundant optical element within the system. Although acceptable for systems produced in low quantities where the additional expense of designing special optics is more than the cost of using standard beam expanding telescopes, it is not the optimum solution for a high volume product where cost and space is at a premium.

There is therefore a need for an isolator design that removes the additional collimating lens at the output of the isolator. Unfortunately, removal of this lens causes a major design problem for a product family of lasers defined by different beam qualities. In the example quoted above, there would need to be three different beam expanding telescopes for each of the three lasers. These beam expanding telescope designs would not be interchangeable between the lasers without additional functionality such as additional lenses or adjustability) being provided. Thus there is a need to provide nine different beam expanding telescopes in order to match the beams to the three mechanical scanner units. The complication described above increases rapidly with the number of different laser beam qualities and the number of mechanical scanner units being catered for. And it is for this reason that prior art laser systems for high volume requirements are provided with a range of beam adaption accessories, which need to be designed, manufactured and supported in customer applications It would be advantageous if there were optical isolators and laser systems that enable greater commonality of laser accessories between different laser types. Such an advance would lead to fewer accessories that need to be designed, manufactured and controlled by the laser user. An aim of the present invention is to provide an apparatus and method for optical isolation which reduces the above aforementioned problem.

SUMMARY

Accordingly, the present invention provides an apparatus for optically isolating a light beam from a laser, which light beam has a beam quality defined by an $M^2$ value, and which apparatus comprises:

- an input lens;
- an optical isolator configured to isolate the light beam;
- a reference plane;
- an output connector disposed at the output of the optical isolator, wherein the output connector is configured with a common collimator interface to connect to a collimator which is capable of being mechanically referenced to the reference plane; and
- a first lens arrangement disposed proximal to a distal end of the output connector, and wherein:
- the $M^2$ value is between 1 and 25;
- the optical isolator is a polarization independent isolator;
- the light beam is not collimated in the optical isolator;
- the input lens is disposed to receive the light beam and to focus the light beam through the optical isolator to the first lens arrangement;
- the input lens provides a light beam diameter within the optical isolator of less than 1 mm, which light beam diameter is dependent on the $M^2$ value;
- the first lens arrangement provides an output light beam having a predetermined divergence that is independent of the $M^2$ value, and
- the collimator interface and the predetermined divergence that is independent of the $M^2$ value enable a family of interchangeable collimators to be used in the apparatus, each collimator providing a different pre-determined beam diameter that is independent of $M^2$ when the collimator is fitted to the apparatus.

The invention enables a radical simplification of the collimation accessories required for typical laser families. For example, a typical product offering may be three fiber lasers, each defined by different beam qualities. For a given optical isolator design, the input beam to the isolator has to be tailored according to the beam quality of the fiber laser such that the beam path through the isolator is optimized. The beam then needs to be collimated in order to be compatible with industry standard optical scanning optics. Typical beam diameters are 5 mm, 7.5 mm and 10 mm. Consequently, different collimator designs are required, each dependent upon the beam quality of the fiber laser and the required beam diameter of the collimated beam. In the example given, up to nine different collimator designs may be required. Alternatively, adjustment may be added into the collimator in order to account for the different beam qualities.

The invention removes this complexity by only requiring up to three designs of the first lens arrangement to provide the beam having the predetermined divergence from the beam waist, and three designs of the collimators that comprise the second lens arrangement to provide the 5 mm, 7.5 mm and 10 mm collimated beams. Moreover, the 10 mm collimator can be interchanged from a fiber laser having one beam quality, and used on a fiber laser having a different beam quality to provide an output beam having the same collimated beam diameter.

The cost benefits of the invention are considerable. They include: (i) the ability to use smaller isolators that are lower cost as a result of using smaller internal crystals compared to larger isolators; (ii) less accessories (such as collimators and beam expanding telescopes) required because of the provision of the output beam having the predetermined divergence; and (iii) the ability to integrate the collimator with laser processing apparatus and have detachable and interchangeable lasers.

The first lens arrangement can be positioned to provide a beam waist at a predetermined distance from the reference plane.

The first lens arrangement can be concentric with the light beam.

The first lens arrangement can be defined by a focal length, and the beam waist can be separated from the first lens arrangement by a distance approximately equal to the focal length.

The first lens can be a negative lens. This is particularly advantageous for lasers in which the peak power of the laser output is greater than 1 kW because it avoids problems associated with ionization of the air with a real focus.

The beam waist can be a virtual beam waist.

The apparatus can include the collimator.

The collimator can comprise a second lens arrangement for converting the light beam having the predetermined divergence to a collimated beam having a predetermined beam diameter, the apparatus being such that if the collimator is attached to the output connector and mechanically referenced to the reference plane, the predetermined beam diameter is independent of the beam quality of the light beam.

The second lens arrangement can be a single positive lens. The second lens arrangement can be an air-spaced doublet.

The apparatus can include a laser connected to the optical isolator via the optical input. The laser can be characterized by a peak power intensity greater than 1 kW. The laser can be selected from the group comprising a fiber laser, a disk laser, a rod laser, or a gas laser.

The apparatus can comprise a plurality of the optical isolators, each configured to isolate a light beam having a different beam quality to the other light beams; a plurality of the output connectors each connected to a different one of the optical isolators; a plurality of the reference planes, each associated with a different one of the optical isolators; and a plurality of the first lens arrangements, each located proximal to a distal end of a different one of the optical connectors; wherein: the first lens arrangements are each selected to provide an output light beam having the same predetermined divergence; the first lens arrangements are each positioned to provide a beam waist at the predetermined distance from their respective reference plane; whereby the collimator is able to be connected to any one of the output connectors to provide the same predetermined beam diameter.

The first lens arrangements can each be positioned to provide the beam waist at the same predetermined distance from their respective reference plane.

The apparatus can include a collimator having a different second lens arrangement connected to any one of the output connectors to provide a different predetermined beam diameter.

The apparatus can comprise a plurality of lasers each connected to the optical input of a different one of the isolators. The lasers can each be defined by a different beam quality.

The invention may be considered to be a plurality of lasers, which plurality of lasers comprises lasers having different beam qualities, configured to emit laser radiation with a predetermined beam divergence such that interchangeable collimators can be fitted to the lasers in order to provide predetermined beam diameters. The plurality of lasers is such that each laser comprises an optical isolator, an output connector, a reference plane, and a first lens arrangement, wherein for each laser: the optical isolator is configured to isolate the laser radiation; the output connector is located at the output of the optical isolator; the first lens arrangement is located proximal to a distal end of the output connector; the output connector is configured to connect to a collimator; the collimator is such that it can be mechanically referenced to the reference plane. In each laser: the first lens arrangement is selected to provide an output light beam having a predetermined divergence; the first lens arrangement is positioned to provide a beam waist at a predetermined distance from the reference plane; wherein the predetermined divergence is the same for each of the lasers.

The first lens arrangement may comprise a negative lens.

The beam waist may be a virtual beam waist.

The collimator may comprise a second lens arrangement for converting the light beam having the predetermined divergence to a collimated beam having a predetermined beam diameter, and the predetermined beam diameter may be the same for each of the lasers when the light beam is collimated by the same collimator.

The plurality of lasers may include at least one of the collimators.

The plurality of lasers may comprise a plurality of the collimators, wherein each collimator is characterised by a different distance between the second lens arrangement and the beam waist when connected to the output connector of one of the lasers, and wherein each of the collimators emits a collimated beam having different predetermined beam diameters.

The predetermined divergence may be between 50 mrad and 200 mrad. The predetermined divergence may be between approximately 90 mrad and 125 mrad.

The first lens arrangement may be separated from the isolator by a distance of at least 20 mm.

The lasers may comprise fiber lasers. The lasers may comprise disk lasers. The lasers may comprise rod lasers.

The invention may be a laser when selected from the plurality of lasers.

The present invention further provides a method of using plug and play components such that input light beams that have a plurality of distinct beam qualities ($M^2$) can be used to provide, to a collimator, a light beam that has the same pre-determined divergence and the same predetermined distance from a reference plane so that the same collimator can provide a collimated beam with substantially the same collimated beam diameter using lasers that that input light beams that have a plurality of different beam qualities provide. The method of the present invention may be used with lasers that include an optical isolator, an output connector, a reference plane and a first lens arrangement. One end of the output connector component is located at the output of the optical isolator and may be releasably secured thereto as a separate component or formed as an integral part of the optical isolator. The first lens arrangement is located within the output connector at the opposite end of the output connector. The output connector includes a mechanical interface for connection to a collimator such that the collimator can be referenced to the reference plane. The lens arrangement within any particular output connector component is selected form a plurality of optically different lens arrangements so that there are output connector components that have different lens arrangements, but each have an identical mechanical interface. Because the different output connectors have a common mechanical interface they may each be connected to a collimator that has a compatible interface. Thus, a particular lens arrangement may be selected and used as desired.

According to the present invention therefore, the method of using plug and play components such that input light beams that have a plurality of different beam qualities ($M^2$) can be used to provide, to a collimator, a light beam that has the same pre-determined divergence and the same predetermined distance from a reference plane comprises the steps of: determining the beam quality $M^2$ of an input light beam; determining the position and a beam waist diameter of the light beam; selecting a lens arrangement from among the plurality of optically different lens arrangements based upon on the $M^2$ of the light beam, the beam waist diameter, and the position of the beam waist, such that the output light beam has a predetermined divergence and the output light beam appears to emerge from an aperture at a predetermined distance from the reference plane; providing the selected lens arrangement in an output connector at the output of an optical isolator.

By virtue of this method, the apparatus described herein may be used to enable plug and play compatibility in that a different apparatus characterized by light beam having a different $M^2$, but having an output connector with the same mechanical interface, and a lens selected and positioned to provide the same predetermined divergence and the same predetermined distance can be connected into the same collimator to provide a collimated beam with substantially the same collimated beam diameter. The beam waist and the lens are preferably aligned with respect to the mechanical interface to enable the plug and play compatibility.

BRIEF DESCRIPTION OF DRAWINGS

Embodiments of the invention will now be described solely by way of example and with reference to the accompanying drawings in which.

DETAILED DESCRIPTION

Figure 1:
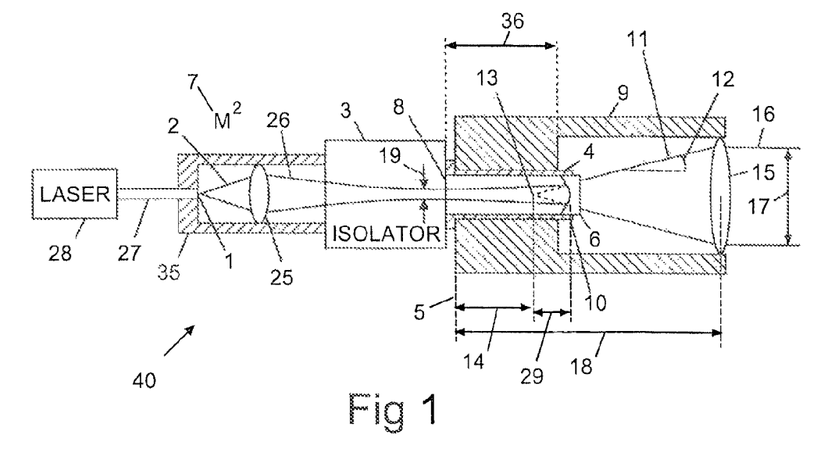
FIG. 1 shows apparatus for optically isolating a light beam according to the present invention.

FIG. 1 shows apparatus for optically isolating a light beam, which apparatus comprises an optical input 1 for a light beam 2, an optical isolator 3, an output connector 4, a reference plane 5, and a first lens arrangement 6, wherein: the light beam 2 is defined by a beam quality 7; the optical isolator 3 is configured to isolate the light beam 2; the output connector 4 is located at the output 8 of the optical isolator 3; the output connector 4 is configured to connect to a collimator 9 which is able to be mechanically referenced to the reference plane 5; the first lens arrangement 6 is located proximal to a distal end 10 of the output connector 4; and the first lens arrangement 6 is selected to provide an output light beam 11 having a predetermined divergence 12.

The first lens arrangement 6 is positioned to provide a beam waist 13 at a predetermined distance 14 from the reference plane 5.

The collimator 9 comprises a second lens arrangement 15 for converting the output light beam 11 having the predetermined divergence 12 to a collimated beam 16 having a predetermined beam diameter 17. When the collimator 9 is attached to the output connector 4 and mechanically referenced to the reference plane 5, the predetermined beam diameter 17 is independent of the beam quality 7 of the light beam 2.

Tolerancing between the collimator 9 and the output connector 4 is important for beam stability and to minimize thermal effects due to temperature changes. Coned and tapered mating surfaces (not shown) on the collimator 9 and the output connector 4 can assist in location accuracy and wear resistance.

Different beam diameters 17 can be achieved by changing the distance 18 between the reference plane 5 and the second lens arrangement 15. This can be achieved with collimators having different focal lengths, adding length adjustment for example with a screw thread or mechanical inserts, having different location points for the second lens arrangement 15, changing the position of the reference plane 5, or a combination of the above.

The first lens arrangement 6 is preferably concentric with the light beam 2.

Figure 2:
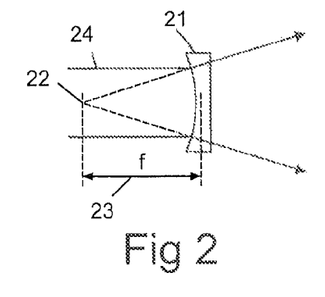
FIG. 2 shows a negative lens not according to the present invention.

The first lens arrangement 6 can comprise a negative lens 21 as shown with reference to FIG. 2. Parallel light rays 24 form a virtual focal point 22 at a focal distance 23 from the lens 21.

Figure 3:
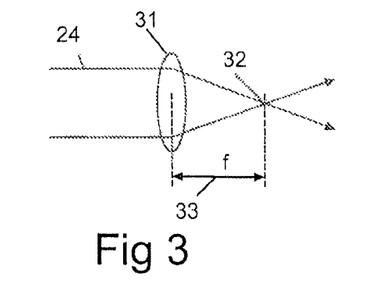
FIG. 3 shows a positive lens not according to the present invention.

Alternatively, the first lens arrangement 6 can comprise a positive lens 31 as shown with reference to FIG. 3. Parallel light rays 24 form a real focal point 32 at a focal distance f 33 from the lens 31.

Referring again to FIG. 1, the invention is particularly useful for high power lasers that have average powers greater than 1 W, or preferably greater than 10 W. These require specialist isolators that are capable of high power operation. The isolator 3 may be model number PI-9.0-YB-300 supplied by Electro-Optics Technologies, Inc. of Traverse City, Mich., United States of America which may be adapted according to the invention. The isolator 3 may be a wedge based isolator or a displacement isolator. The isolator 3 may be a polarization insensitive isolator or an isolator configured to isolate a polarized light beam.

The first lens arrangement 6 is shown as being a negative lens with the beam waist 13 separated from the first lens arrangement 6 by a distance 29 approximately equal to the focal length 23 shown with reference to FIG. 2. The beam waist 13 is a virtual beam waist, which is particularly advantageous for use with lasers in which the peak power of the laser output is greater than 1 kW because it avoids problems associated with ionization of the air which can occur with a real beam waist obtained with a positive lens such as the lens 31 shown in FIG. 3.

The second lens 15 is shown a being a single positive lens. Alternatively, combinations of lenses can be used. Preferably the second lens 15 is an air-spaced doublet.

FIG. 1 also shows a laser 28 connected to the optical isolator 3 via the optical input 1. The laser 28 is shown as being connected with an optical fiber cable 27 from which the light beam 2 diverges. An input lens 25 is provided in order to focus or collimate a light beam 26 through the isolator 3. The input lens 25 is held in a housing 35.

The laser 28 can be selected from the group comprising a fiber laser, a disk laser, a rod laser, or a gas laser.

The laser 28 may be a ytterbium pulsed fiber laser such an SP-20P pulsed fiber laser manufactured by SPI Lasers UK Limited of Southampton, England. These lasers have peak power intensities greater than 1 kW and are characterized by different average power outputs and by different beam qualities. Three basic types are provided, having beam qualities given by $M^2=1$, 2 and 3. The divergence of the output beams of these lasers are very different, and this requires the input lens 25 to be optimized for each laser in order to optimize the path through the isolator 3 and hence the degree of optical isolation provided by the isolator 3. Once the input lens 25 is optimized, the first lens arrangement 6 can be selected and positioned in order to provide the predetermined divergence 12. Alternatively or additionally, the selection and design of the input lens 25 and the first lens arrangement 6 can be iterated for optimal performance.

The input lens 25 controls the diameter 19 of the light beam 26 as it propagates through the isolator 3. Minimal diameter is optimal for cost reasons since this reduces the cost of crystals used in the isolator. However if the beam diameter 19 is too small, material damage thresholds in the crystals may be exceeded. This material damage would usually occur on the surfaces of the crystals. The optimization of the input lens 25 thus needs a trade off for these two competing requirements. Different optimization is required for different beam qualities 7. Different optimization may also be required for different fiber cables 27.

The cost benefits of the invention increase as the size of the isolator 3 reduces. Smaller isolators 3 require smaller beam diameters 19 which lead to increased variation in the design of the input lens 25 and the first lens arrangement 6 as the beam quality 7 of the light beam 2 is altered. The beam diameter 19 is preferably less than 1 mm, and more preferably less than 0.5 mm.

The invention enables a family of optical isolators 3 to be designed, each configured to isolate a light beam 2 with a different beam quality 7. The design of each of the isolators 3 would vary in the design and configuration of the input lens 25, configured to optimize the optical isolation of the isolator, and the design and configuration of the first lens arrangement 6, configured to provide the same predetermined divergence 12 for each of the isolators. Preferably the optical isolators 3 are fiber coupled at their input using a fiber cable 27 providing convenient coupling means to lasers and in particular to fiber lasers.

The invention also enables a family of collimators 9 to be produced that are compatible with each of the optical isolators 3. Each collimator 9, by virtue of the predetermined divergence 12 of the output beam 11, provides the same predetermined beam diameter 17 with each of the isolators 3. When fitted to the isolators 3, each collimator 9 has different distance between the second lens arrangement 15 and the reference plane 5, and thus provides different output beam diameters 17 to that obtained with the other collimators 9. The optical isolators 3 can each be fitted to different lasers 28 having different beam qualities.

The invention may then be considered to be a laser 40 configured to emit a light beam 11 defined by the same predetermined divergence 12, Collimators 9 can be attached to the laser 40 to provide the output beam 16 having the predetermined beam diameter 17. Advantageously the beam diameter 17 may be selected to be compatible with optical scanners, and in particular industry standard optical scanners specified for input beams having 5 mm, 7.5 mm and 10 mm input beam diameters.

The optical isolators 3 may be manufactured and sold with or without the collimator 9. The optical isolators 3 are preferably fiber coupled with a fiber cable 27.

The lasers 40 that comprise the optical isolators 3 may be manufactured and sold with or without the collimator 9.

The invention enables the collimators 9 to be interchangeable with the lasers 40, with the output beam diameter being set by the collimators 9 irrespective of the beam quality 7 of the lasers 40.

Figure 4:
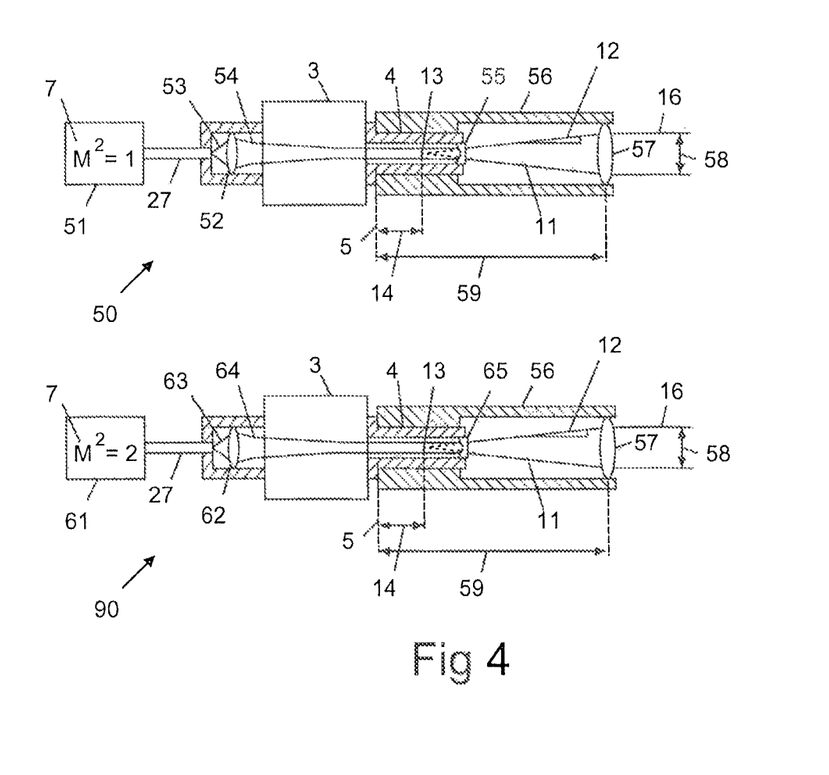
FIG. 4 shows apparatus comprising two lasers having different beam qualities, each connected to an isolator which emits a light beam having the same predetermined beam divergence, and connected to the same collimator design which emits a collimated light beam having the same diameter.

FIG. 4 shows two lasers 51, 61 having different beam qualities. The lasers are connected to the isolator 3 by the fiber cable 27. The input beams 53, 63 are conditioned by input lens 52, 62 which are selected to optimize the isolation of the light beams 54, 64 through the isolator 3. Each of the isolators 3 have a first lens arrangement 55, 65 to provide the light beam 11 having the same predetermined divergence 12. Since the beam quality of the lasers 51, 61 are different from each other, the first lens arrangements 55, 65 are also likely to comprised different lenses. A collimator 56 is attached to each of the isolators 3 to provide a collimated beam 16 having the same predetermined diameter 58. The collimator 56 comprises a second lens arrangement 57 a distance 59 from the reference plane 5.

Figure 5:
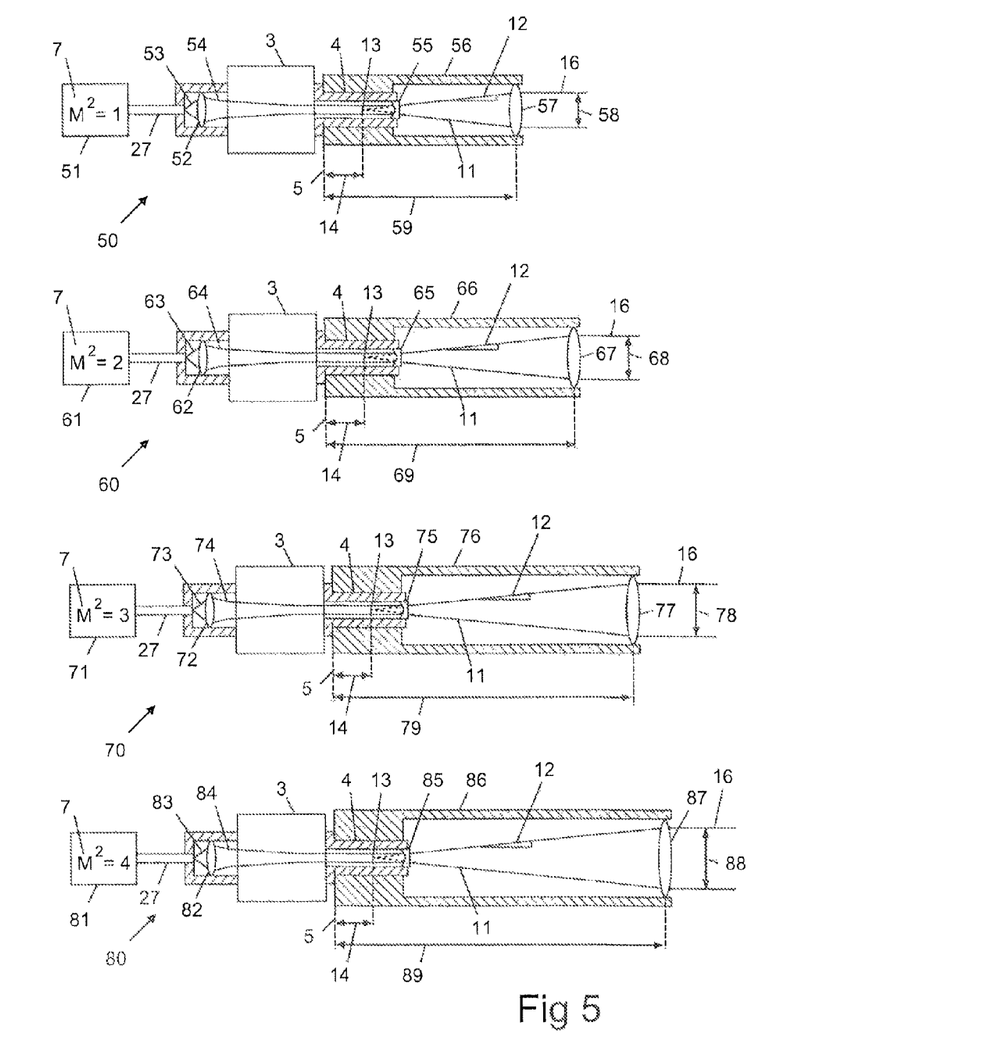
FIG. 5 shows apparatus comprising four lasers, each having different beam qualities, each connected to an isolator which emits a light beam having the same predetermined beam divergence, and connected to different collimator designs which emit a collimated light beam having different diameters.

FIG. 5 shows a plurality of lasers 51, 61, 71, 81, which plurality of lasers comprises lasers 51, 61, 71, 81 having different beam qualities 7, configured to emit laser radiation 11 with a predetermined beam divergence 12 such that interchangeable collimators 56, 66, 76, 86 can be fitted to the lasers in order to provide predetermined beam diameters 58, 68, 78, 88. Each laser 51, 61, 71, 81 is configured to emit laser radiation 53, 63, 73, 83 defined by a different beam quality 7. Each laser comprises an optical isolator 3, an output connector 4, a reference plane 5, and a first lens arrangement 55, 65, 75, 85. For each laser 51, 61, 71, 81, the optical isolator 3 is configured to isolate the laser radiation 53, 63, 73, 83; the output connector 4 is located at the output of the optical isolator 3; the first lens arrangement 55 is located proximal to a distal end of the output connector 4; and the output connector 4 is configured to connect to a collimator 56, 66, 76, 86. The collimators 56, 66, 76, 86 are such that they can be mechanically referenced to the reference plane 5. The first lens arrangements 55, 65, 75, 85 are selected to provide an output light beam 11 having a predetermined divergence 12. The first lens arrangements 55, 65, 75, 85 are positioned to provide a beam waist 13 at a predetermined distance 14 from the reference plane 5. The predetermined divergence 12 is the same for each of the lasers 51, 61, 71, 81.

As a consequence of the input radiation 53, 63, 73, 83 having different beam qualities 7, different input lens arrangements 52, 62, 72, 82 are required to optimize the light beams 54, 64, 74, 84 through the isolator 3 as described above with reference to FIG. 1. The input lens arrangements 53, 63, 73, 83 can comprise a lens (as shown) or a self focusing lens.

Preferably the isolator 3 is fiber coupled at its input with a fiber cable 27. Different fiber cables 27 may be selected for receiving light having different beam qualities 7. A fiber coupled isolator is particularly advantageous because it can be coupled simply to a laser having the beam quality 7 matched to the input lens 52, 62, 72, 82 and first lens arrangements 55, 65, 75, 85.

The first lens arrangements 55, 65, 75, 85 preferably comprise a negative lens and the beam waist 13 is preferably a virtual beam waist as shown. The negative lens and the virtual beam waist are useful design features for laser peak powers greater than approximately 1 kW.

The collimators 56, 66, 76, 86 comprise a second lens arrangement 57, 67, 77, 87 for converting the light beam 11 having the predetermined divergence 12 to a collimated beam 16 having a predetermined beam diameter 58, 68, 78, 88. Each of the collimators 56, 66, 76, 86 are characterized by a different distance 59, 69, 79, 89 between the second lens arrangement 57, 67, 77, 87 and the beam waist 13 when connected to the output connector 4 of one of the lasers 51, 61, 71, 81. Consequently, each of the collimators 56, 66, 76, 86 emits a collimated beam 16 having different predetermined beam diameters 58, 68, 78, 88. Advantageously, the collimators 56, 66, 76, 86 are interchangeable between the lasers 51, 61, 71, 81. The predetermined beam diameter 58, 68, 78, 88 is the same for each of the lasers 51, 61, 71, 81 when the light beam 11 is collimated by the same collimator 56, 66, 76 or 86.

The first lens arrangements 6, 55, 65, 75, 85 may be such that the predetermined divergence 12 is between 50 mrad and 200 mrad. The predetermined divergence 12 is preferably between approximately 90 mrad and 125 mrad.

The first lens arrangements 6, 55, 65, 75, 85 are preferably separated from the isolator 3 by a distance 36 (shown with reference to FIG. 1) of at least 20 mm. This is to improve tolerance to back reflections that may occur from surfaces of materials that are being laser processed.

Referring to FIGS. 4 and 5, the lasers 51, 61, 71, 81 can comprise fiber lasers, disk lasers or rod lasers.

The invention can be a laser when selected from a plurality of lasers 50, 60, 70, 80, 90 shown in FIGS. 4 and 5. The laser can be provided with or without the interchangeable collimators 56, 66, 76, 86 which may be sourced separately from a different supplier. The plurality of lasers 50, 60, 70, 80, 90 can comprise a plurality of at least one of the interchangeable collimators 56, 66, 76, 86.

The invention can also be a plurality of isolators 3 comprising the lasers 50, 60, 70, 80, 90 shown in FIGS. 4 and 5 but without the lasers 51, 61, 71, 81. The invention can also be an isolator 3 when selected from the plurality of isolators 3. The family of isolators 3 or single isolator 3 is preferably fiber coupled with a fiber cable 27. The isolators 3 can be provided or without the interchangeable collimators 56, 66, 76, 86 which may be sourced separately from a different supplier.

The invention is particularly useful for beam qualities 7 defined by an $M^2$ between approximately 1 and 25, and more preferable for beam qualities 7 defined by an $M^2$ less than 10.

Figure 6:
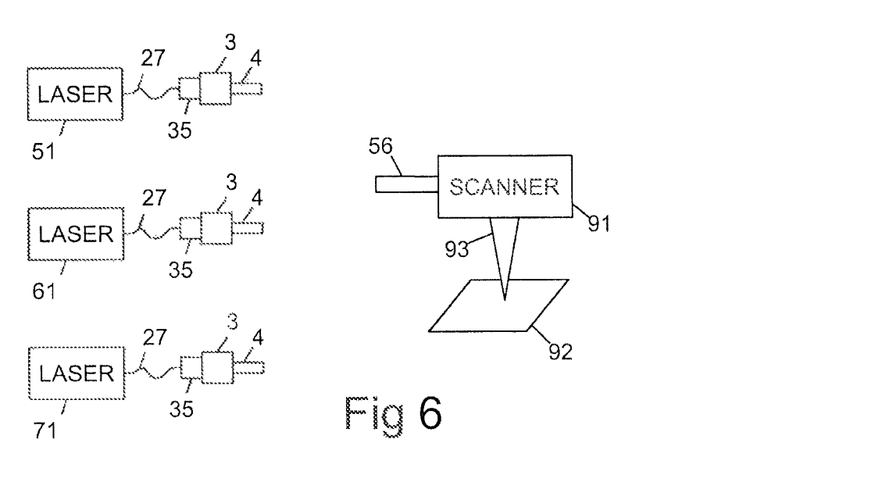
FIG. 6 shows laser processing apparatus comprising a collimator and interchangeable lasers.

Advantageously, the collimator 9, 56, 66, 76, or 86 can be attached to laser processing apparatus 91 as shown in FIG. 6. The laser processing apparatus 91 is depicted as a scanner for scanning and focusing a laser beam 93 onto a material 92 to be laser processed. By laser processing, it is meant processes such as marking, engraving, cutting, drilling, scribing, brazing, cladding, and welding. Different lasers 51, 61, 71 can be connected to the collimator 56 via the isolator 3 and output connectors 4, thus enabling the apparatus to be a laser processing apparatus 91 with interchangeable lasers 51, 61, 71. Prior art systems either use larger beams and expensive isolators, or use collimated lasers that output a collimated laser beam. The collimated laser beam would then be expanded using a beam expanding telescope to interface properly to the appropriate scanner.

For size and cost benefits, and with reference to FIGS. 1, 4, 5 and 6, the optical isolator 3 is preferably one that is too small to operate with a collimated light beam through it. Preferably, the optical isolator 3 is one in which the light beam 2 is focused through the optical isolator 3. The beam diameter 19 (shown with reference to FIG. 1) is preferably less than 1 mm, and more preferably less than 0.5 mm. A light beam 2 having such a small beam diameter will diverge as it emerges from the optical isolator 3; the light beam 2 is not collimated in the isolator 3.

The cost benefits of the invention described with reference to FIGS. 1-6 are therefore considerable. They include: (i) the ability to use smaller isolators 3 that are lower cost as a result of using smaller internal crystals compared to larger isolators; (ii) less accessories (such as collimators and beam expanding telescopes) required because of the provision of the output beam 11 having the predetermined divergence 12; and (iii) the ability to integrate the collimator 56 with the laser processing apparatus 91 and have detachable and interchangeable lasers.

It is to be appreciated that the embodiments of the invention described above with reference to the accompanying drawings have been given by way of example only and that modifications and additional components may be provided to enhance performance. Individual components shown in the drawings are not limited to use in their drawings and they may be used in other drawings and in all aspects of the invention. The present invention extends to the above-mentioned features taken in isolation or in any combination.

We claim:

1. An apparatus for optically isolating a light beam from a laser, which light beam has a beam quality defined by an $M^2$ value, and which apparatus comprises:
   an input lens;
   an optical isolator configured to isolate the light beam;
   a reference plane;
   an output connector disposed at the output of the optical isolator, wherein the output connector is configured with a common collimator interface to connect to a collimator which is capable of being mechanically referenced to the reference plane; and
   a first lens arrangement disposed proximal to a distal end of the output connector,
   and wherein:
   the $M^2$ value is between 1 and 25;
   the optical isolator is a polarization independent isolator;
   the light beam is not collimated in the optical isolator;
   the input lens is disposed to receive the light beam and to focus the light beam through the optical isolator to the first lens arrangement;
   the input lens provides a light beam diameter within the optical isolator of less than 1 mm, which light beam diameter is dependent on the $M^2$ value;
   the first lens arrangement provides an output light beam having a predetermined divergence that is independent of the $M^2$ value, and
   the collimator interface and the predetermined divergence that is independent of the $M^2$ value enable a family of interchangeable collimators to be used in the apparatus, each collimator providing a different pre-determined beam diameter that is independent of $M^2$ when the collimator is fitted to the apparatus.

2. The apparatus of claim 1, wherein the first lens arrangement is positioned to provide a beam waist at a pre-determined distance from the reference plane.

3. The apparatus of claim 2, wherein the first lens arrangement is concentric with the light beam.

4. The apparatus of claim 2, wherein the first lens arrangement is defined by a focal length, and the beam waist is separated from the first lens arrangement by a distance approximately equal to the focal length.

5. The apparatus of claim 2, wherein the beam waist is a virtual beam waist.

6. The apparatus of claim 1, wherein the first lens arrangement is concentric with the light beam.

7. The apparatus of claim 1, wherein the first lens arrangement is a negative lens.

8. The apparatus of claim 1 and including a collimator comprising a second lens arrangement for converting the light beam having the predetermined divergence to a collimated beam having a pre-determined beam diameter, the apparatus being such that if the collimator is attached to the output connector and mechanically referenced to the reference plane, the pre-determined beam diameter is independent of the beam quality $M^2$ value.

9. The apparatus of claim 8, wherein the second lens arrangement is a single positive lens.

10. The apparatus of claim 8, wherein the second lens arrangement is an air-spaced doublet.

11. The apparatus of claim 1 and including a laser, wherein the laser is connected to the optical isolator via the input lens.

12. The apparatus of claim 11, wherein the laser is characterized by a peak power intensity greater than 1 kW.

13. A system comprising a plurality of the apparatus of claim 11, wherein each of the apparatus has the same predetermined divergence, and each of the lasers can be plugged into the collimator to provide an output light beam having the same pre-determined beam diameter.

14. The system of claim 13, wherein the plurality of lasers are each defined by a different $M^2$ value.

15. A system comprising a plurality of the apparatus of claim 11 and including a plurality of the collimators, each collimator having a different pre-determined beam diameter, wherein any of the lasers can be plugged into any one of the collimators to provide the unique pre-determined beam diameter.

16. The system of claim 15 wherein the plurality of lasers are each defined by a different $M^2$ value.

17. The apparatus of claim 1 wherein the Input lens is selected to provide the light beam diameter within the optical isolator such that the light beam diameter is of less than 0.5 mm.

18. An apparatus for providing an optically isolated light beam, which light beam has a beam quality defined by a first $M^2$ value, and which apparatus comprises:
   a first optical isolator configured to isolate a first input light beam having the first $M^2$ value;
   a reference plane;
   an output connector having a mechanical interface, wherein the output connecter is connected to a collimator comprising a collimating lens to provide a collimated beam having a collimated beam diameter;
   a beam waist having a position and a beam waist diameter; and
   a first lens selected to provide a divergence based on the first $M^2$ value, the beam waist diameter, and the position of the beam waist, and wherein the position of the first lens within the apparatus is selected such that a first output light beam appears to emerge from an aperture at a predetermined distance from the reference plane;
   and wherein:
   the first $M^2$ value is between 1 and 25;
   the first optical isolator is a polarization independent isolator;
   the light beam is not collimated in the optical isolator; and
   whereby the apparatus is such that a different apparatus comprising a second optical isolator configured to isolate a second input light beam defined by a second $M^2$ value that is different from the first $M^2$ value but having a second output connector with substantially the same mechanical interface, and a second lens selected and positioned to provide substantially the same predetermined divergence and substantially the same predetermined distance is capable of being connected Into the same collimator to provide a collimated beam with substantially the same collimated beam diameter.

19. The apparatus of claim 18, wherein the beam waist and the first lens are aligned.

* * * * *

UNITED STATES PATENT AND TRADEMARK OFFICE
CERTIFICATE OF CORRECTION

| | | |
|---|---|---|
| PATENT NO. | : 9,130,334 B2 | Page 1 of 1 |
| APPLICATION NO. | : 13/475047 | |
| DATED | : September 8, 2015 | |
| INVENTOR(S) | : Durkin et al. | |

It is certified that error appears in the above-identified patent and that said Letters Patent is hereby corrected as shown below:

Title Page at (75) "Inventors: Michael Kevin Durkin, Southampton" should read --Inventors: Michael Kevan Durkin, Southampton--.

Signed and Sealed this
First Day of December, 2015

Michelle K. Lee
*Director of the United States Patent and Trademark Office*

UNITED STATES PATENT AND TRADEMARK OFFICE
CERTIFICATE OF CORRECTION

PATENT NO. : 9,130,334 B2
APPLICATION NO. : 13/475047
DATED : September 8, 2015
INVENTOR(S) : Durkin et al.

Page 1 of 1

It is certified that error appears in the above-identified patent and that said Letters Patent is hereby corrected as shown below:

Title Page 1 at (73) "Assignee: SPI UK Laserts Ltd., Southampton" should read --Assignee: SPI Lasers UK Ltd., Southampton--.

Signed and Sealed this
Twelfth Day of July, 2016

Michelle K. Lee
*Director of the United States Patent and Trademark Office*